(12) United States Patent
Sherbeck et al.

(10) Patent No.: US 9,581,265 B2
(45) Date of Patent: Feb. 28, 2017

(54) ROTARY ACTUATOR AND VALVE

(71) Applicants: Jonathan A. Sherbeck, Tempe, AZ (US); Benjamin Ruddell, Gilbert, AZ (US)

(72) Inventors: Jonathan A. Sherbeck, Tempe, AZ (US); Benjamin Ruddell, Gilbert, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 442 days.

(21) Appl. No.: 14/195,609

(22) Filed: Mar. 3, 2014

(65) Prior Publication Data
US 2014/0245773 A1    Sep. 4, 2014

Related U.S. Application Data (60) Provisional application No. 61/772,185, filed on Mar. 4, 2013.

(51) Int. Cl.
| | | |
|---|---|---|
| F16K 31/06 | (2006.01) | |
| F16K 31/04 | (2006.01) | |
| F16K 11/083 | (2006.01) | |

(52) U.S. Cl.
CPC ........ F16K 31/041 (2013.01); F16K 11/0833 (2013.01); *Y10T 137/0318* (2015.04); *Y10T 137/86863* (2015.04)

(58) Field of Classification Search
CPC ... F16K 11/072; F16K 11/0833; F16K 31/041

USPC ........ 137/627.5, 627, 625.41, 625.4, 625.46, 137/625.47
See application file for complete search history.

(56) References Cited

U.S. PATENT DOCUMENTS

| | | | |
|---|---|---|---|
| 3,989,063 A | | 11/1976 | Brouwers et al. |
| 4,531,840 A | * | 7/1985 | Clark .................. B01F 15/0429 366/142 |
| 4,546,338 A | * | 10/1985 | Idogaki et al. .......... F02M 3/07 137/625.47 |
| 4,840,193 A | | 6/1989 | Schiel |
| 5,038,826 A | | 8/1991 | Kabai et al. |
| 5,285,809 A | * | 2/1994 | Shimoguri .............. F04B 39/16 137/203 |
| 5,429,154 A | | 7/1995 | Kato |
| 5,703,555 A | * | 12/1997 | McCann ................ H02K 26/00 310/40 R |
| 5,915,416 A | | 6/1999 | Okazaki et al. |
| 7,740,226 B2 | | 6/2010 | Engel et al. |
| 8,776,829 B2 | * | 7/2014 | Sugie et al. .......... F16K 11/076 137/625.15 |

(Continued)

*Primary Examiner* — Kevin Lee
(74) *Attorney, Agent, or Firm* — Snell & Wilmer L.L.P.

(57) ABSTRACT

Various systems, methods and apparatuses for a rotary valve are disclosed. A rotary valve apparatus may have a case, a fluid conducting apparatus inside the case, and an electromagnetic actuator. The electromagnetic actuator may align the fluid conducting apparatus with various ports in the case. In this manner, fluid may be conducted through the ports. The electromagnetic actuator may rotate the fluid conducting apparatus to align with different ports in the case. Thus, the apparatus may operate as a valve, connecting and disconnecting various ports in response to the electromagnetic actuator.

14 Claims, 7 Drawing Sheets

(56) References Cited

U.S. PATENT DOCUMENTS

2010/0107669 A1   5/2010   Wada

\* cited by examiner

Section A-A

Section B-B

FIG. 7

Section B-B

ROTARY ACTUATOR AND VALVE

CROSS REFERENCE TO RELATED APPLICATION

This application claims priority to, and the benefit of, U.S. Provisional Application Ser. No. 61/772,185 entitled "ROTARY ACTUATOR AND VALVE" and filed Mar. 4, 2013, the contents of which are incorporated herein by reference.

TECHNICAL FIELD

The present disclosure relates to valves, and in particular, to electrically actuated valves to permit refrigerant flow between multiple devices.

BACKGROUND

Energy storage systems are receiving increasing attention as users of air conditioning and other refrigeration systems seek systems with greater efficiency. Many users wish to continue using their existing system in place but desire a mechanism for retrofitting their system for increased efficiency, for example, with an energy storage system.

A significant challenge facing those who wish to add an energy storage system to a refrigeration system arises when trying to interconnect the systems with valves. For instance, prior attempts to add energy storage systems to a refrigeration system often fail to prove satisfactory due to the currently available actuators and valves which often require many joints and interconnections. Such configurations are prone to failure, or often require multiple fittings and seals, or often cause an excessive operational pressure drop. Thus there is a need for a valve adapted to allow connection of an energy storage system to a refrigeration system, capable of being retrofitted to existing air conditioning and other refrigeration systems, or capable of use in new systems, wherein many seals and joints are eliminated so that the system is available at low cost and high reliability.

SUMMARY

In various embodiments, a rotary valve apparatus comprises a case, an electromechanical actuator, a fluid conducting apparatus disposed within the case and movable in response to the electromechanical actuator, and a plurality of fluid ports disposed about a circumference of the case.

In various embodiments, a heat pump system comprises a heat pump, a first rotary valve, a second rotary valve, and an energy storage system. In various embodiments, the first rotary valve and the second rotary valve connect the energy storage apparatus in parallel with the heat pump.

In various embodiments, a method of operating a rotary valve comprises energizing a first stator coil pair, rotating a magnetic rotor to align with the first stator coil pair in response to the energizing, aligning a fluid conduction apparatus comprising a fluid transfer passageway with a first port and a second port in response to the rotating, and conducting fluid through the fluid transfer passageway.

BRIEF DESCRIPTION OF THE DRAWINGS

With reference to the following description, appended claims, and accompanying drawings as attached:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for valve design, electrical system construction, valve manufacturing, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction, system, or device.

In accordance with principles of the present disclosure, an energy peak shaving scheme using ice storage may be contemplated, wherein an energy storage apparatus comprising a storage and extraction tank for forming and melting ice may be adaptably interfaced with a cooling system. The cooling system may be utilized, for example, as a heat pump, or for forming ice, or for melting ice to extract stored energy. Such a peak load reduction system using ice as thermal energy storage (TES) is desirable, for example for a retrofit market. For example, an ice storage system may be added to an existing heat pump system. At night, the condensing unit may be connected to the TES when the air conditioning demand is met. During the night and day, the condensing unit may be connected to the indoor air handler when air conditioning is desired. During peak hours, the TES may be connected to the indoor air handler. In an exemplary embodiment, the power utilized is for the indoor fan, controls, and a refrigerant pump if included in the system. If the TES is positioned above the indoor air handler, a thermosyphon can provide refrigerant circulation for energy extraction. In order to make the connections between the ice storage system and the heat pump system, a rotary valve apparatus according to the principles of the present disclosure may be utilized.

Figure 1:
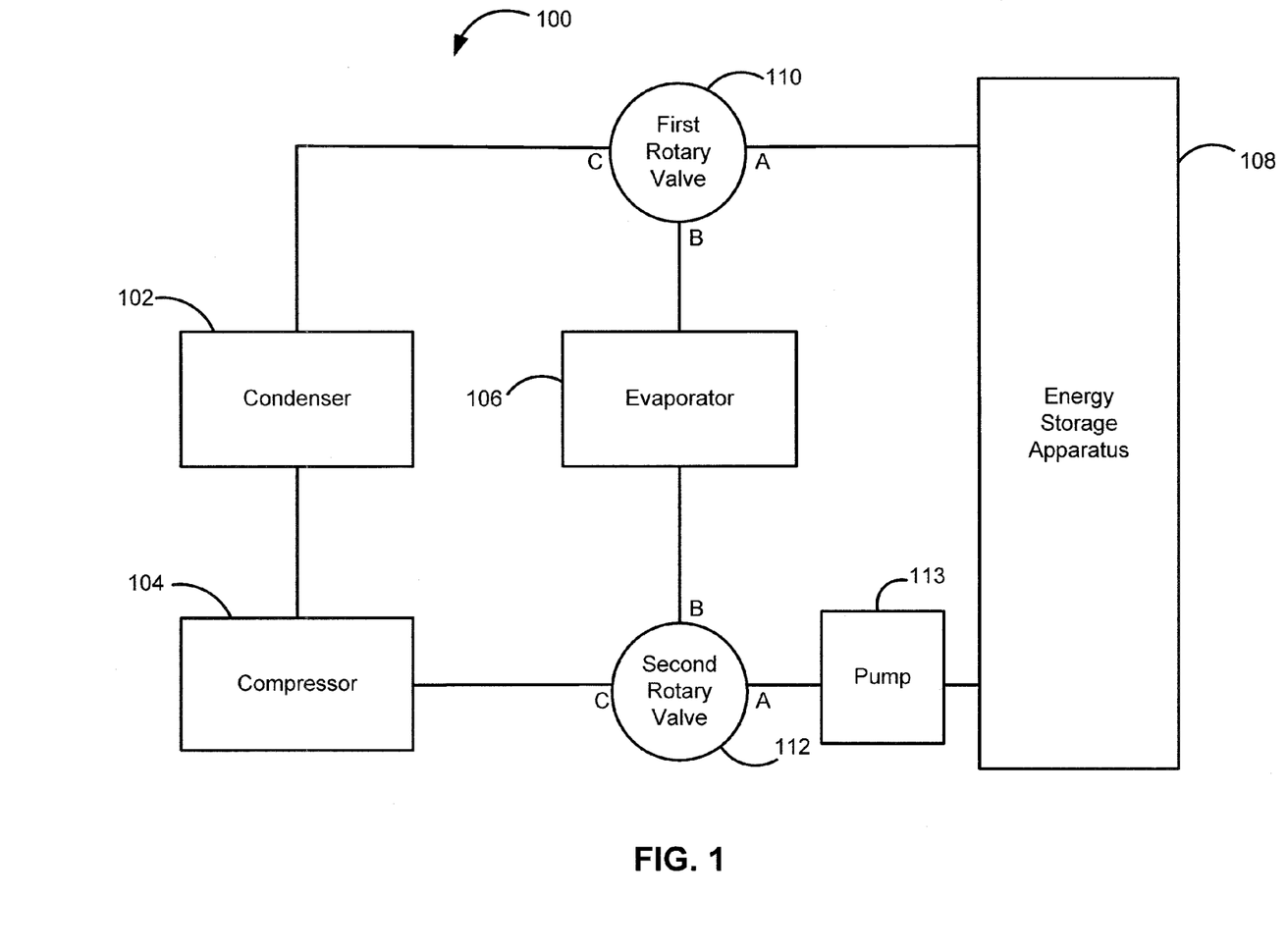
FIG. 1 illustrates an exemplary heat pump system having an energy storage apparatus coupled via rotary valves in accordance with various embodiments.

For example, with reference now to FIG. 1, in various embodiments an improved heat pump system 100 comprises a heat pump, a first rotary valve, a second rotary valve, and an energy storage apparatus. For example, heat pump system 100 comprises a heat pump comprising a condenser 102, a compressor 104, and an evaporator 106 disposed in a loop whereby coolant may flow, for example in a clockwise direction, from the condenser 102 to the evaporator 106 to the compressor 104 and back to the condenser 102. In various embodiments, the direction of coolant flow may be reversed and coolant may flow in an opposite, for example counterclockwise, direction. Thus in this manner, the evaporator 106 may be alternately caused to cool or to warm an ambient environment in response to the direction of coolant flow.

In various embodiments, a first rotary valve 110 may be disposed in the coolant path between the condenser 102 and the evaporator 106. In various embodiments, a second rotary valve 112 may be disposed in the coolant path between the evaporator 106 and the compressor 104. Moreover, one or more rotary valves 110 and/or 112 may be disposed at any suitable locations in system 100, as desired.

In various exemplary embodiments, improved heat pump system 100 comprises an energy storage apparatus 108. First rotary valve 110 and second rotary valve 112 connect energy storage apparatus 108 in parallel with various components of the heat pump system 100, for example, the evaporator 106. In this manner, first rotary valve 110 and second rotary valve 112 may be operated to remove the evaporator 106 from the fluid circuit and insert the energy storage apparatus 108 instead. Alternatively, first rotary valve 110 and second rotary valve 112 may be operated to remove the compressor 104 and condenser 102 from the fluid circuit and insert the energy storage apparatus 108 instead. In this manner, rotary valves 110 and/or 112 may be configured to permit energy storage apparatus 108 to substitute in the circuit for either the heat sinking side of the circuit, or for the heat sourcing side of the circuit, as desired. Fluids may be moved and/or pressurized within improved heat pump system 100 via any suitable mechanism and/or apparatus, for example via pump 113 as illustrated in FIG. 1.

Figure 2:
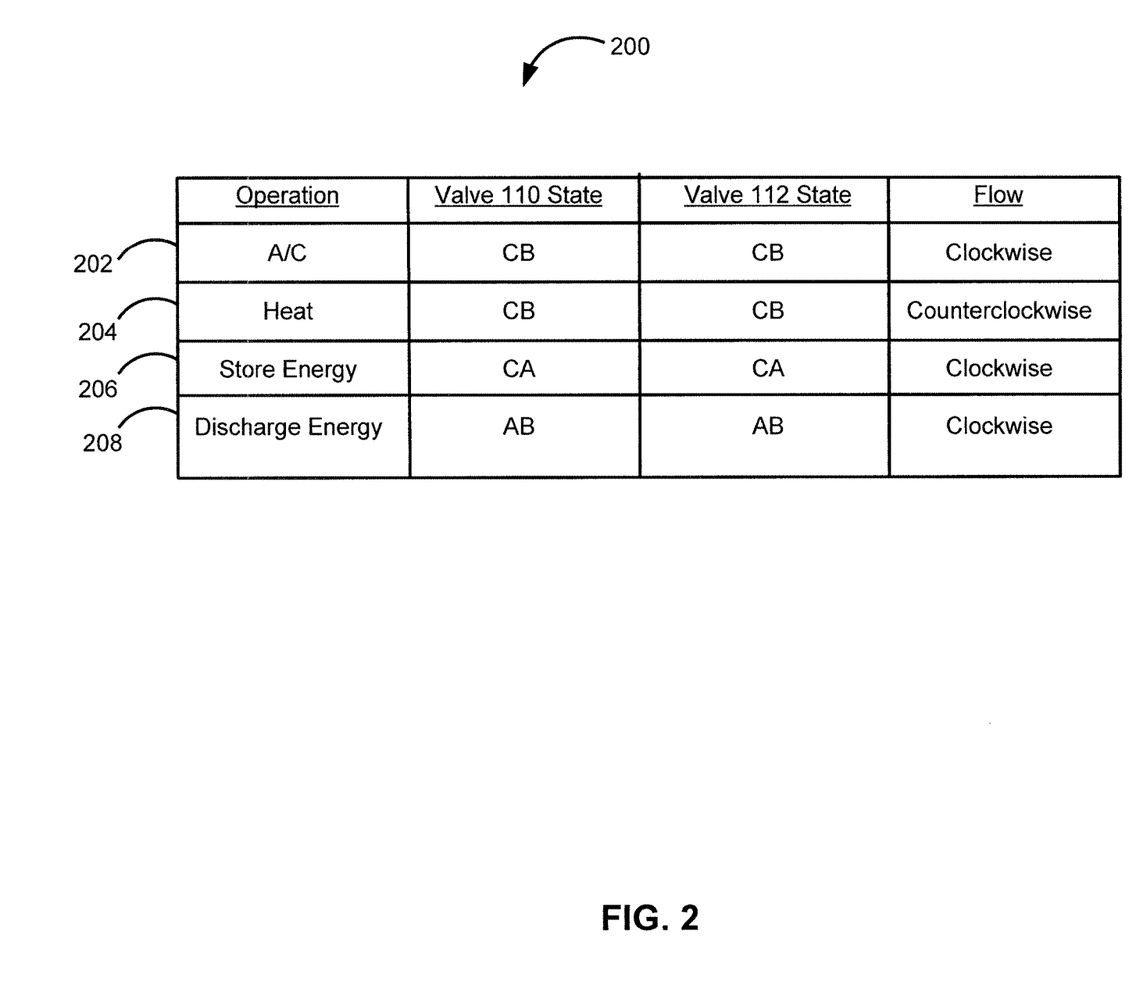
FIG. 2 illustrates an exemplary chart of system states of an exemplary heat pump system having an energy storage apparatus coupled via rotary valves in accordance with an exemplary embodiment.

With reference now to FIGS. 1 and 2, in various embodiments, an improved heat pump system 100 may be configured in a variety of configurations, for example configured differently according to a variety of operating states 200. In various embodiments, improved heat pump system 100 may pump heat from condenser 102 to evaporator 106, or may pump heat from evaporator 106 to condenser 102. In this manner, system 100 may warm the environment around evaporator 106, or may cool the environment around evaporator 106, respectively. Moreover, improved heat pump system 100 may pump heat from energy storage apparatus 108 to condenser 102, storing cooling energy in energy storage apparatus 108. Energy storage apparatus 108 may then be connected to evaporator 106 and improved heat pump system 100 may pump heat from evaporator 106 to energy storage apparatus 108 using pump 113, thereby cooling the environment around evaporator 106.

Thus, in various embodiments, an improved heat pump system 100 may be configured for multiple states 200, for example at least A/C State 202, Heat State 204, Store Energy State 206, and Discharge Energy State 208. For example, in various embodiments, an improved heat pump system 100 may be configured for A/C State 202. In this state, first rotary valve 110 is configured to connect ports C and B, second rotary valve 112 is configured to connect ports C and B, and coolant is circulated in a clockwise direction (as illustrated in FIG. 1). In A/C State 202, system 100 is configured to cool the environment surrounding evaporator 106 and warm the environment surrounding condenser 102.

An improved heat pump system 100 may be configured for Heat State 204. In this state, first rotary valve 110 is configured to connect ports C and B, second rotary valve 112 is configured to connect ports C and B, and coolant is circulated in a counterclockwise direction (as illustrated in FIG. 1). In Heat State 204, system 100 is configured to warm the environment surrounding evaporator 106 and cool the environment surrounding condenser 102.

An improved heat pump system 100 may be configured for Store Energy State 206. In this state, first rotary valve 110 is configured to connect ports C and A, second rotary valve 112 is configured to connect ports C and A, and coolant is circulated in a clockwise direction (as illustrated in FIG. 1). In Store Energy State 206, system 100 is configured to cool energy storage apparatus 108 and warm the environment surrounding condenser 102, thus storing energy in energy storage apparatus 108.

An improved heat pump system 100 may be configured for Discharge Energy State 208. In this state, first rotary valve 110 is configured to connect ports A and B, second rotary valve 112 is configured to connect ports A and B, and coolant may be circulated in a clockwise direction (as illustrated in FIG. 1). In Discharge Energy State 208, system 100 is configured to cool the environment surrounding evaporator 106, without using condenser 102. In this manner, stored energy may be released from energy storage apparatus 108 to effectuate cooling of the environment surrounding evaporator 106, similar to the cooling that occurs during A/C State 202.

Figure 3:
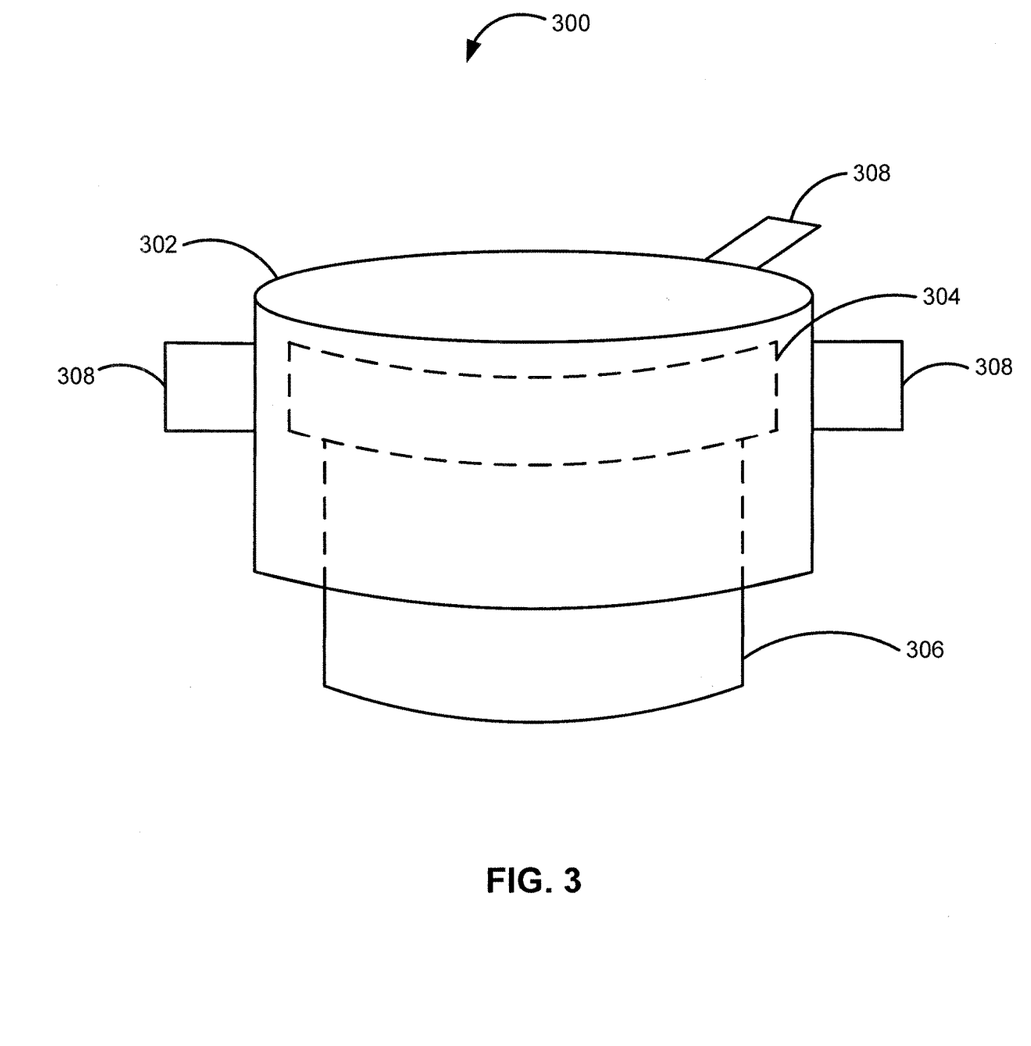
FIG. 3 illustrates a block diagram of an exemplary rotary valve apparatus.

With reference now to FIGS. 1 and 3, in various embodiments, first rotary valve 110 may comprise a rotary valve apparatus 300, and second rotary valve 112 may comprise a rotary valve apparatus 300. First rotary valve 110 and second rotary valve 112 may be configured to be similarly sized, similarly constructed, and or similarly operational; moreover, first rotary valve 110 and second rotary valve 112 may differ from one another, for example in size, materials, an/or like, in order to achieve one or more desired operational characteristics of system 100.

Turning to FIG. 3, in various embodiments, a rotary valve apparatus 300 comprises a case 302, a fluid conducting apparatus 304, an electromechanical actuator 306, and a plurality of fluid ports 308. In various embodiments, a rotary valve apparatus 300 further comprises a balance port 412 (as illustrated in FIG. 5) and a solenoid coil 610 (as illustrated in FIG. 4), as further discussed hereinbelow.

Figure 4:
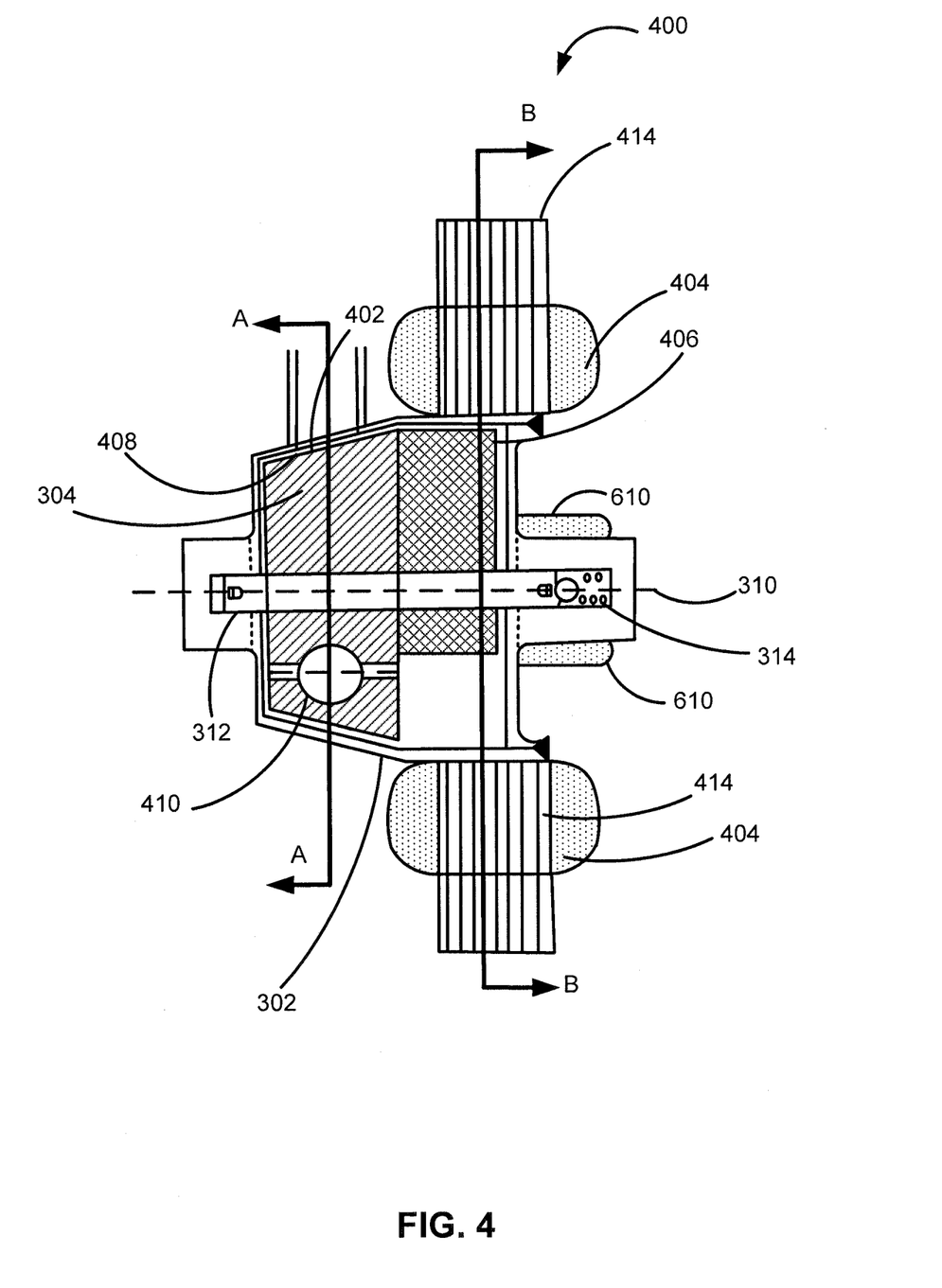
FIG. 4 illustrates a side view of an exemplary rotary valve apparatus.
Figure 5:
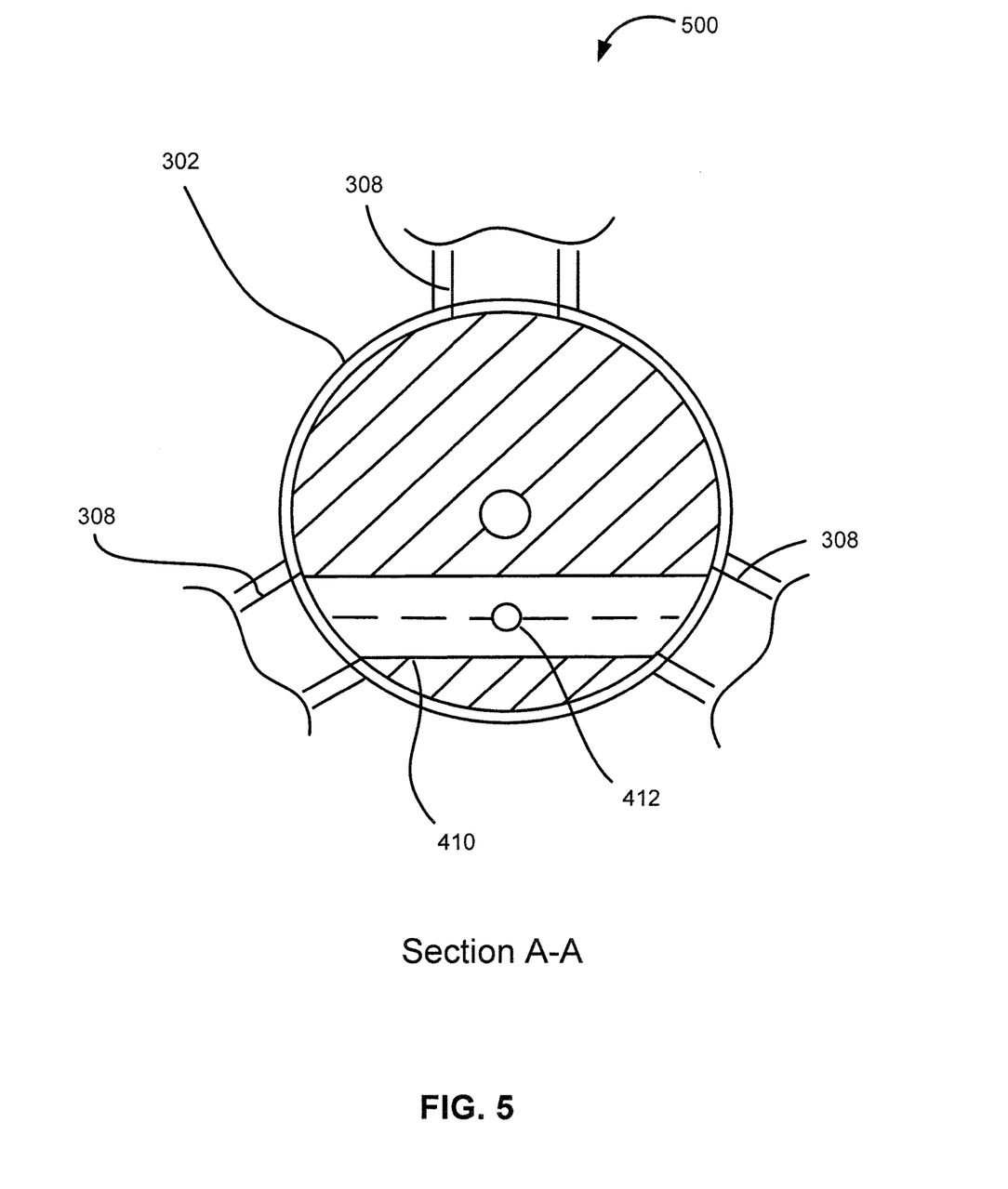
FIGS. 5-7 illustrate section views of an exemplary rotary valve apparatus in accordance with various embodiments.

With reference now to FIGS. 3-5, case 302 may comprise a plurality of fluid ports 308, for example disposed circumferentially about the perimeter of the case 302. In one example embodiment, three ports are arranged about the case 302. In one example embodiment, these ports are disposed at about 120 degrees from each other, though any position suitably configured to interface with refrigerant lines may be utilized. In one example embodiment, the ports are configured as ¼" NPT, and the portion of the body about which the ports are disposed has a diameter of about 1.700", though any dimension configured to permit the fluid ports 308 to connect in fluid communication with the fluid conducting apparatus 304 may be adopted.

Furthermore, rotary valve apparatus 300 may be a two position valve, or a four position valve, or a valve having any number of positions adaptably configured to interconnect any number of components with a fluid system. As such, in accordance with principles of the present disclosure, a rotary valve apparatus 300 may have two ports, or four ports, or may have any number of ports arranged about the case in any pattern adapted to interconnect components with a fluid system.

In one example embodiment, the case 302 is hermetically sealed. Case 302 may comprise 300 series stainless steel and be welded together to make a hermetically sealed unit. In another example embodiment, 2" diameter 6061-T6 bar stock may be chosen for case 302, though any metal, ceramic, alloy, composite, or other material suitable for forming case 302 may be utilized. In one example embodiment, a pair of SAE #220 Nitrile rubber O-rings may be utilized to seal portions of a case 302, though any O-ring or other sealing mechanism or component that results in an acceptable seal may be utilized. In one example embodiment, case 302 has an inner diameter of about 1.625", though any diameter, suitable for use in conjunction with a chosen O-ring and acceptable case fatigue life may be utilized. Still further, one example embodiment may also comprise an internal snap ring, for example having a size of between about 1.5" and about 2", and preferably about 1.75". It will be appreciated that the foregoing dimensions and configuration for case 302 are given by way of example, and not of limitation.

With reference now to FIGS. 4 and 5, case 302 may be configured with a cylindrical housing. In various embodiments, case 302 may further comprise a conic section. However, case 302 may comprise any shape, geometry, or structure of housing configured to retain a fluid conducting apparatus 304. In various embodiments, case 302 further comprises three fluid ports 308, and a first locking surface 402. First locking surface 402 may comprise an internal face of case 302 configured to interface with fluid conducting apparatus 304 (for example, a second locking surface 408 of fluid conducting apparatus 304).

In various embodiments, fluid conducting apparatus 304 is disposed within case 302. Fluid conducting apparatus 304 may be movable in response to operation of electromechanical actuator 306. In various embodiments, fluid conducting apparatus 304 is axially rotatable about an axis 310 passing through the center of case 302. Fluid conducting apparatus 304 may be moved in response to operation of electromechanical actuator 306 and may connect various fluid ports 308, for example in pairs.

In various embodiments, fluid conducting apparatus 304 comprises a second locking surface and a first transfer passage. For example, fluid conducting apparatus 304 may comprise second locking surface 408. Second locking surface 408 may comprise a surface of fluid conducting apparatus 304 configured to interface with first locking surface 402 of case 302. In this manner, first locking surface 402 may comprise a face of a conic portion of case 302, and second locking surface 408 may comprise a face of a conic portion of fluid conducting apparatus 304. In various embodiments, first locking surface 402 and second locking surface 408 may comprise a face of a differently shaped portion of a case 302 and fluid conducting apparatus 304, respectively. Moreover, first locking surface 402 and second locking surface 408 may comprise faces having any shapes, coatings, roughness, or texturing suitable for holding the fluid conducting apparatus 304 in substantially fixed rotational position, for example, to prevent the fluid conducting apparatus 304 from inadvertent movement or rotation, while still also permitting desired movement or rotation.

In various embodiments, fluid conducting apparatus 304 comprises a first transfer passage 410. First transfer passage 410 may comprise a hollow aperture substantially aligned with a chord of fluid conducting apparatus 304. However, first transfer passage 410 may comprise any aperture, pathway, tunnel, tube, or conduit having any orientation such that first transfer passage 410 may be oriented to connect two fluid ports 308.

Turning now to FIGS. 3-7, in various embodiments, rotary valve apparatus 300 comprises an electromechanical actuator 306. An electromechanical actuator 306 may comprise a reluctance actuator 404 and a magnetic rotor 406. In various embodiments, reluctance actuator 404 may generate an electromagnetic field whereby a motive force may be exerted on magnetic rotor 406. For example, in various embodiments a reluctance actuator 404 may comprise at least one coil of wire which generates an electromagnetic field when energized. In various embodiments, magnetic rotor 406 comprises a semicircular body comprising a ferromagnetic material. However, any suitable shape for magnetic rotor 406 may be utilized. In various embodiments, magnetic rotor 406 is attached to fluid conducting apparatus 304. Thus, reluctance actuator 404 may exert a motive force on magnetic rotor 406 whereby fluid conducting apparatus 304 may be translated along axis 310 and/or rotated about axis 310. In this manner, fluid conducting apparatus 304 may be selectively moved so that the fluid transfer passage 410 selectively connects different fluid ports 308.

Figure 6:
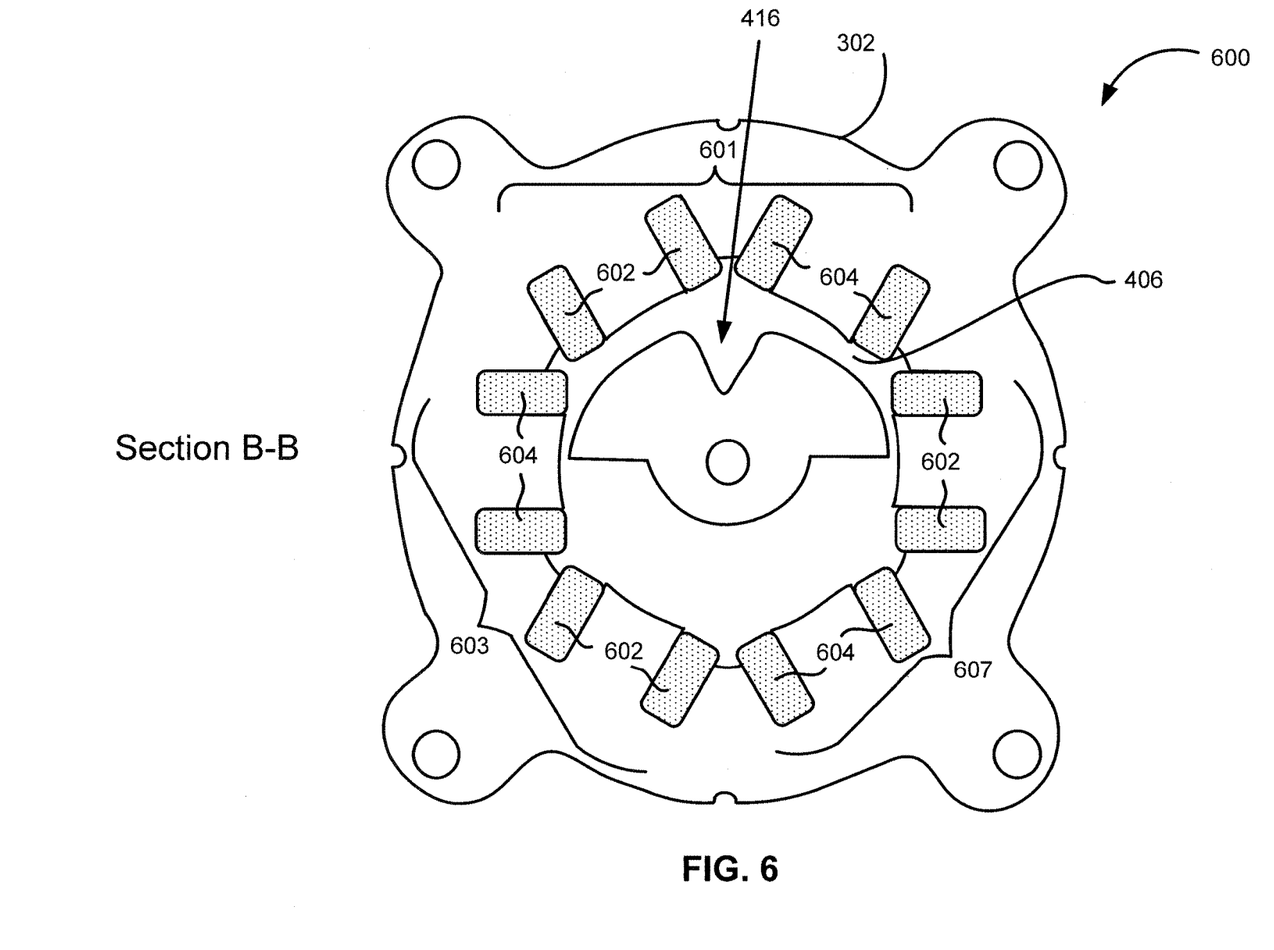

In various embodiments, a reluctance actuator 404 comprises a first coil pair 601, a second coil pair 603, and a third coil pair 607. Each coil pair may be positioned at least partially around the circumference of case 302, such that each coil pair, when energized, impels fluid conducting apparatus 304 to be selectively moved to connect a different pair of fluid ports 308, in accordance with the principles disclosed herein.

Moreover, in various embodiments, each coil pair comprises a clockwise stator coil and a counterclockwise stator coil. For example, first coil pair 601 may comprise a clockwise stator coil 602 and a counterclockwise stator coil 604. Second coil pair 603 may comprise a clockwise stator coil 605 and a counterclockwise stator coil 606. Third coil pair 607 may comprise a clockwise stator coil 608 and a counterclockwise stator coil 609. A clockwise stator coil may comprise a wound coil of wire having the wire wound in an opposite direction compared to a counterclockwise stator coil. In this manner, and in accordance with the right-hand rule, a clockwise stator coil and the corresponding counterclockwise stator coil may generate magnetic lines of force operating in opposite directions. Thus, a north magnetic pole and a south magnetic pole may be established for each coil pair. In various embodiments, by selectively energizing different coil pairs, magnetic rotor 406 may be moved to different orientations coinciding with the different coil pairs. In various example embodiments, coils of 250 turns of 28 gauge magnet wire potted in epoxy may be used. Moreover, any suitable number of turns and any suitable gauge of wire may be utilized in order to ensure reliable operation of reluctance actuator 404.

In one example embodiment, the windings alternate between clockwise (CW) and counter-clockwise (CCW) windings so that each position has a north magnetic pole, and a south magnetic pole, though any winding configuration adapted to cause the valve to rotate when actuated may be implemented. In one example embodiment, reluctance actuator 404 comprises three pairs of windings, though any number of windings or pairs of windings may be utilized to permit the valve to interface with a particular number and arrangement of ports.

Furthermore, in one example embodiment, the windings are wired in a Y configuration, with the common leg going through an optional coil to produce rotor thrust. Thus, a rotary valve apparatus 300 may comprise a solenoid coil 610. Solenoid coil 610 may be configured to help lift fluid conducting apparatus 304 to disengage second locking surface 408 from first locking surface 402, for example in order to reduce the torque needed to move and/or rotate fluid conducting apparatus 304. In other example embodiments, solenoid coil 610 may be omitted. For example, solenoid coil 610 may be omitted if the coil pairs are installed with a sufficiently high elevation as to lift the fluid conducting apparatus 304 without a solenoid coil 610.

In various embodiments, reluctance actuator 404 further comprises a lamination stack 414. In one example embodiment, the lamination stack 414 may comprise 26 layers of a six pole laminate of 0.018" thick M-19 electrical steel. However, any suitable lamination architecture configured to operate the rotary valve apparatus 300 at a desired operational voltage and current and with desired operational characteristics may be implemented. In various embodiments of rotary valve apparatus 300, the coils fit into slots of the lamination stack 414 of reluctance actuator 404. In one embodiment, the laminate design has about a 1.700" diameter bore with the pole width generally equal to the space in between poles. It will be appreciated that the foregoing dimensions and sizes are given by way of example and illustration, and not of limitation.

Figure 7:
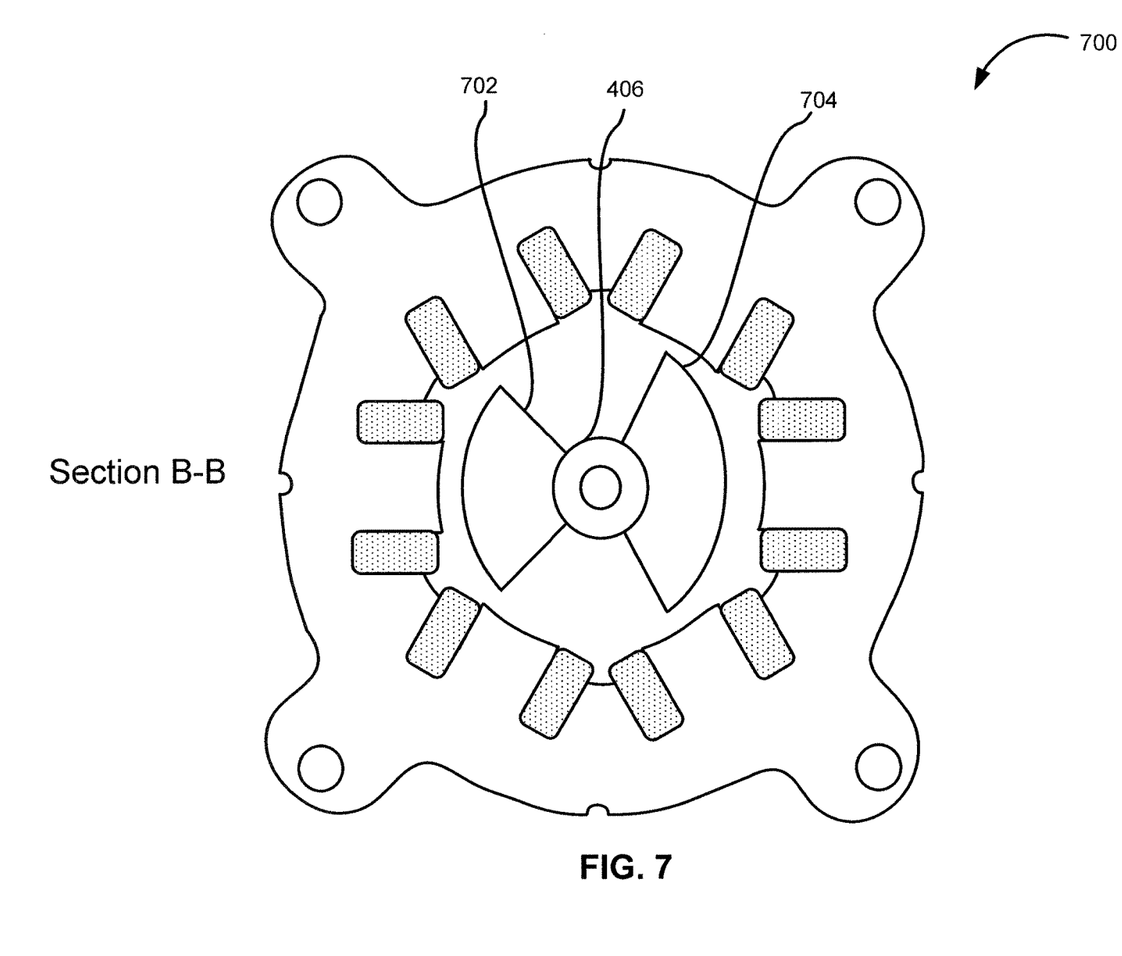

With reference now to FIGS. 4, 6, and 7, in various embodiments, a magnetic rotor 406 may comprise a semicircular body comprising a ferromagnetic material. In various embodiments, magnetic rotor 406 is attached to fluid conducting apparatus 304. Thus, when magnetic rotor 406 is translated or rotated in response to selectively energizing different coil pairs of reluctance actuator 404, fluid conducting apparatus 304 is similarly translated and/or rotated. The semicircular body of magnetic rotor 406 may have an arc length of sufficient length relative to (i) the circumference of case 302 and (ii) the positioning of the stator coil pairs, such that by energizing an adjacent coil pair, the magnetic rotor 406 may be moved from an orientation corresponding with one coil pair, to an orientation corresponding with the adjacent coil pair. For example, magnetic rotor 406 may be positioned corresponding with first coil pair 601. In various embodiments, by energizing the third coil pair 607, magnetic rotor 406 may be influenced to reorient corresponding with the third coil pair 607. Alternatively, by energizing the second coil pair 603, magnetic rotor 406 may be influenced to move to a position corresponding with the second coil pair 603. In this manner, a magnetic rotor 406 oriented corresponding to any stator coil pair may be influenced to move to a position corresponding with another stator coil pair by energizing the stator coil pair corresponding to the desired position.

In various embodiments, magnetic rotor 406 comprises a plurality of semicircular sections. For example, with reference again to FIG. 7, in various embodiments, magnetic rotor 406 comprises a magnetically influenced section 704 and a counterweight section 702. In this manner, the balance of the magnetic rotor 406 may be improved. In various embodiments, magnetically influenced section 704 comprises a highly ferromagnetic material, for example iron, steel, and/or the like. In various embodiments, counterweight section 702 comprises a material less ferromagnetic than magnetically influenced section 704, for example copper, brass, and/or the like.

In various embodiments, magnetically influenced section 704 and counterweight section 702 are configured with different sizes. For example, counterweight section 702 may be sized so as to be less able to be stably oriented by reluctance actuator 404, whereas magnetically influenced section 704 may be sized so as to quiesce in a stable orientation when influenced by reluctance actuator 404. In this manner, the magnetic rotor 406 may have a single stable orientation corresponding to each stator coil pair.

In various embodiments, rotary valve apparatus 300 utilizes external power only during movement from a first (i.e., original) position to a second (i.e., new) position. With reference to FIG. 6, in one example embodiment, magnetic rotor 406 is configured with a notch 416. Notch 416 may be disposed in the center along the arc length of the magnetic rotor 406. Moreover, notch 416 may be located in any suitable location such that magnetic rotor 406 is configured to increase the restoring torque versus misalignment curve slope. Moreover, magnetic rotor 406 may be sized, shaped, and/or configured with any suitable components or arrangements such that magnetic rotor 406 is configured to increase the restoring torque versus misalignment curve slope. In one example embodiment, notch 416 is off-center so that magnetic rotor 406 is sufficiently proximate to adjacent coil pairs to provide initial torque and lift to start movement of magnetic rotor 406 to a new position.

In certain embodiments, magnetic rotor 406 may comprise a polyimide plastic and have two sections of about 120 degrees. With reference now to FIG. 7, in various embodiments, these sections comprise a magnetically influenced section 704 and a counterweight section 702. For example, counterweight section 702 may be made of copper and magnetically influenced section 704 may be made of mild steel, though any configuration adapted to permit magnetic rotor 406 to function may be utilized. Furthermore, the height of the steel sector may be about 0.5", and the height of the copper sector may be reduced below the height of the steel sector, for example, to make the copper sector weigh about the same as the steel sector. Moreover, it will be appreciated that any configuration yielding appropriate balance may be implemented.

In one example embodiment, the sectors of magnetic rotor 406 are not both 120 degree sections, but differ from one another, for example in arc length, height, thickness, material, and/or the like. In one example embodiment, the magnetic rotor copper sector maybe drilled and countersunk to accept a fastener, for example a 1.5" long brass 8-32 flat head screw, and the steel sector may be drilled and tapped with an 8-32 thread. An 8-32 screw may then be implemented to join the magnetic rotor sectors. However, any suitable method or components for coupling portions of magnetic rotor 406 may be utilized, as desired.

With reference again to FIG. 5, in various embodiments, rotary valve apparatus 300 further comprises a balance port 412. For example, balance port 412 may be configured as an aperture through case 302 through which tools may be inserted to remove (e.g., drill out) material from fluid conducting apparatus 304 and/or magnetic rotor 406. In this manner, the balance of the various components of the rotary valve apparatus 300 may be fine tuned, as desired.

With reference back to FIG. 4, in various embodiments, rotary valve apparatus 300 further comprises a solenoid coil 610. For example, in some embodiments, reluctance actuator 404 is oriented so as to exert insufficient lift force to disengage second locking surface 408 from first locking surface 402. Thus, in some embodiments, solenoid coil 610 is implemented to provide lift force to disengage the locking surfaces prior to rotation of the magnetic rotor 406 to correspond to a stator coil pair of the reluctance actuator 404.

In various embodiments, case 302 further comprises an axis shaft 312. Axis shaft 312 lies coincident with axis 310. In various embodiments, fluid conducting apparatus 304 is supported by axis shaft 312 and rotates axially about axis shaft 312. In various embodiments, axis shaft 312 connects to fluid conducting apparatus 304 and magnetic rotor 406.

As a result, axis shaft 312 may rotate and translate in unison with fluid conducting apparatus 304 and magnetic rotor 406. Axis shaft 312 may be supported at one end, for example by a spring assembly 314. Spring assembly 314 is configured to impel axis shaft 312, and correspondingly fluid conducting apparatus 304, toward the first locking surface 402 of case 302. Thus, spring assembly 314 may exert a seating force, seating second locking surface 408 against first locking surface 402. In various embodiments, solenoid coil 610 may be positioned to exert a force on magnetic rotor 406 in a direction opposite of spring assembly 314. In this manner, solenoid coil 610 may assist the disengagement and/or engagement of second locking surface 408 with first locking surface 402.

Axis shaft 312 may comprise any suitable material configured to permit the rotary valve apparatus 300 to actuate, for example music wire having a diameter of between about 0.8 mm and about 1.2 mm. In one embodiment, jewel bearings support certain moving components of a rotary valve apparatus 300. The jewel bearings may comprise hematite cylindrical beads and/or the like, although any bushing, bearing, or material chosen for acceptable frictional characteristics may be used.

Furthermore, axis shaft 312 may optionally be omitted, or alternatively, may be used to increase the axial forces during actuation and/or to increase the axial forces at rest, and/or to reduce the drag torque during actuation, and/or to increase the holding torque during rest. Axis shaft 312 and/or magnetic rotor 406 may be configured, responsive to operation of solenoid coil 610, to produce a high initial lift force to free fluid conducting apparatus 304 from case 302.

In accordance with the principles of the present disclosure, rotary valve apparatus 300 may be positioned so that axis 310 is vertical and reluctance actuator 404 is positioned above magnetic rotor 406. Thus, at rest, second locking surface 408 of fluid conducting apparatus 304 rests on first locking surface 402 of case 302. When a pair of coils is powered, fluid conducting apparatus 304 is lifted free of first locking surface 402 and pivots to align with the powered coil pair. When power is removed, fluid conducting apparatus 304 may drop onto first locking surface 402 of case 302 and may be held in place by gravity, for example, on first locking surface 402. Thus, for example, in one embodiment, rotary valve apparatus 300 may only require a small amount of power to change position, and no power during use.

In accordance with the principles of the present disclosure, when a pair of coils is powered, magnetic rotor 406 may move, for example, in a 120 degree increment, or any other increment selected to position fluid transfer passage 410 of fluid conducting apparatus 304 to connect at least two fluid ports 308. In one example embodiment, the coils may be powered by a 12V DC 1 Amp class II transformer with a 0.065 Farad capacitor, though any suitable voltage and/or current source may be utilized. The capacitor may be selected with consideration for the frequency of actuation and actuation force, so the actuator has the greatest magnetic force at just the moment it needs to be operable to lift and pull in the steel sector from an adjacent position.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "proximate," "proximately," or any other variation thereof, are intended to cover a physical connection, an electrical connection, a magnetic connection, an optical connection, a communicative connection, a functional connection, and/or any other connection.

We claim:

1. A rotary valve, comprising:
   a case comprising a first locking surface;
   an electromechanical actuator;
   a fluid conducting apparatus disposed within the case and movable in response to the electromechanical actuator; and
   a plurality of fluid ports disposed about a circumference of the case,
   wherein the electromechanical actuator comprises:
      a magnetic rotor disposed within the case and in mechanical communication with the fluid conducting apparatus; and
      a reluctance actuator wherein the reluctance actuator electromagnetically interacts with the magnetic rotor, whereby the magnetic rotor is rotatable within the case in response to the reluctance actuator; and
   wherein the fluid conducting apparatus comprises:
      a second locking surface corresponding to the first locking surface; and
      a first transfer passage configured to connect two of the ports comprising the plurality of ports.

2. The rotary valve of claim 1, wherein the case comprises an axis shaft about which the fluid conducting apparatus rotates.

3. The rotary valve of claim 1, wherein the plurality of fluid ports comprises three ports.

4. The rotary valve of claim 1, wherein the plurality of fluid ports comprises three ports spaced at 120 degrees from each other about the circumference of the case.

5. The rotary valve of claim 1, wherein the reluctance actuator further comprises a lamination stack.

6. The rotary valve of claim 1, wherein the magnetic rotor comprises a semicircular body comprising a ferromagnetic material.

7. The rotary valve of claim 1, wherein the magnetic rotor comprises:
   a magnetically influenced section adapted to compel the magnetic rotor to rotate within the case in response to the reluctance actuator; and a counterweight section adapted to balance the magnetic rotor.

8. The rotary valve of claim 1, wherein the reluctance actuator comprises three stator coil pairs.

9. The rotary valve of claim 8, wherein each stator coil pair comprises:
   a clockwise-oriented stator coil whereby a first magnetic pole may be generated; and
   a counterclockwise-oriented stator coil whereby a second magnetic pole may be generated,
   wherein the magnetic rotor aligns with the first magnetic pole and the second magnetic pole responsive to power supplied to the stator coil pair.

10. The rotary valve of claim 8, wherein the reluctance actuator further comprises a solenoid coil configured to engage and disengage the first locking surface and the second locking surface.

11. The rotary valve of claim 1, wherein the first locking surface and the second locking surface comprise conic surfaces.

12. The rotary valve of claim 1, wherein the first transfer passage comprises a hollow aperture aligned with a chord of the fluid conducting apparatus.

13. The rotary valve of claim 10, further comprising:
   an axis shaft about which the fluid conducting apparatus rotates; and
   a spring assembly coupled to the axis shaft and configured to impel the first locking surface against the second locking surface.

14. The rotary valve of claim 13, wherein, responsive to operation of the spring assembly, the fluid conducting apparatus and the case remain in a fixed orientation with respect to one another when power is removed from the solenoid coil.

* * * * *